No. 846,484. PATENTED MAR. 12, 1907.
A. LEITCH.
APPARATUS FOR TEACHING ARITHMETIC.
APPLICATION FILED DEC. 21, 1905.

2 SHEETS—SHEET 1.

Witnesses
A. J. Hadden
A. E. Hathaway

Inventor
Andrew Leitch
per R. Hadden
Attorney

No. 846,484. PATENTED MAR. 12, 1907.
A. LEITCH.
APPARATUS FOR TEACHING ARITHMETIC.
APPLICATION FILED DEC. 21, 1905.

2 SHEETS—SHEET 2.

Witnesses
A. J. Haddan
A. E. Hathaway

Inventor
Andrew Leitch
per R. Haddan
Attorney

UNITED STATES PATENT OFFICE.

ANDREW LEITCH, OF SUNDERLAND, ENGLAND.

APPARATUS FOR TEACHING ARITHMETIC.

No. 846,484.     Specification of Letters Patent.     Patented March 12, 1907.

Application filed December 21, 1905. Serial No. 292,762.

*To all whom it may concern:*

Be it known that I, ANDREW LEITCH, a subject of the King of England, residing at Fulwell, Sunderland, Durham, England, have invented certain new and useful Improvements in Apparatus for Teaching Arithmetic, of which the following is a specification.

This invention relates to improvements in apparatus for teaching arithmetic; and the object is to teach children or other pupils by means of symbols and ciphers the composition of numbers and the elementary principles of arithmetic.

The apparatus consists of a frame provided with rows of prisms and slides, as hereinafter described.

Figure 1:
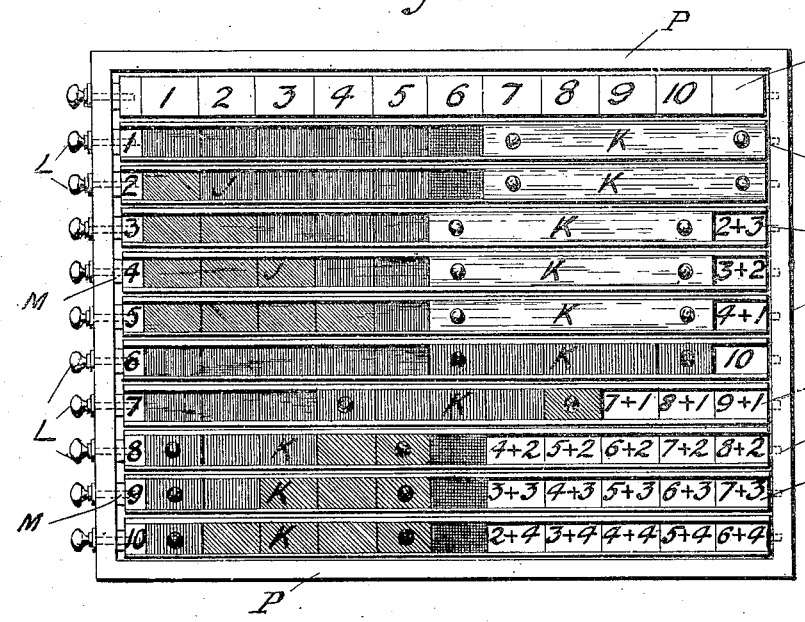
Figure 2:
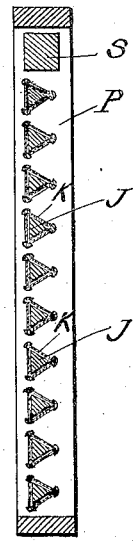
Figure 4:
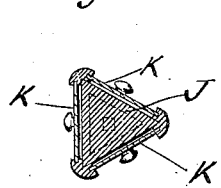
Figure 3:
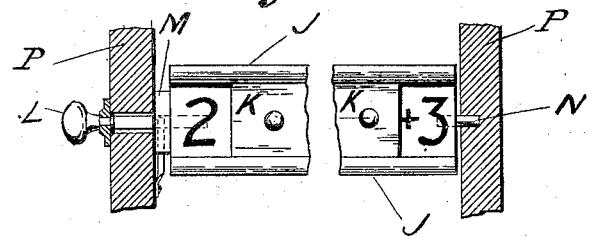
Figure 5:
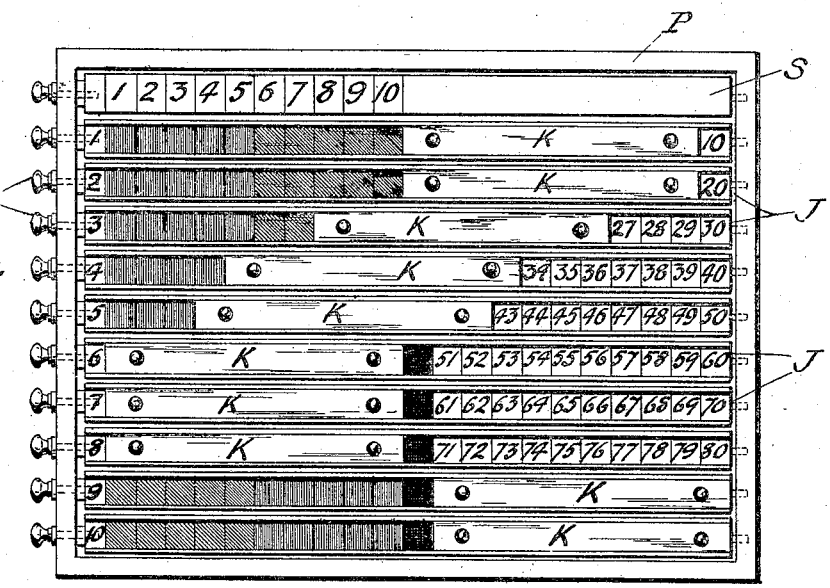
Figure 6:
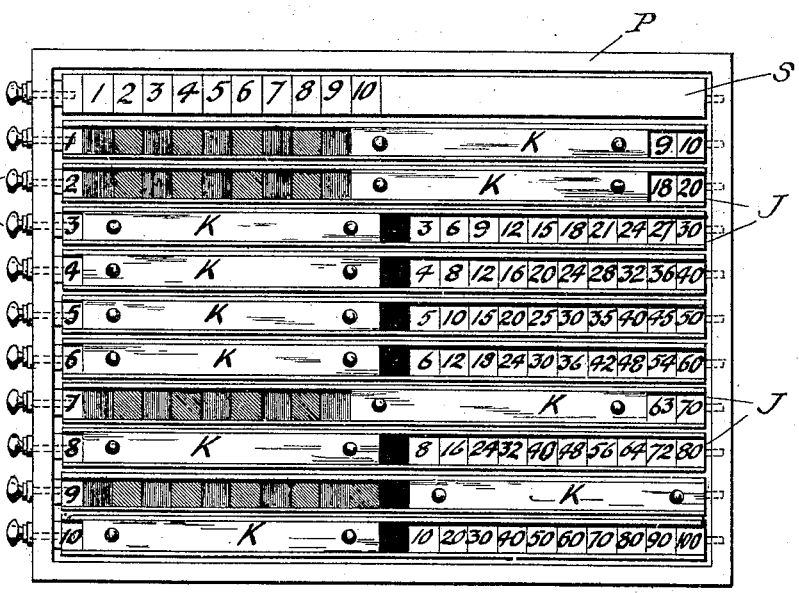

Referring to the annexed drawings, Figure 1 is an elevation, and Fig. 2 a vertical section, of the frame. Fig. 3 is an enlarged detail view of a prism, and Fig. 4 a cross-section thereof. Fig. 5 is an elevation showing the front of the frame with the prisms turned, so as to show faces not shown in Fig. 1. Fig. 6 is a similar elevation showing the faces of the prisms not shown in either Fig. 1 or Fig. 5.

P is a rectangular frame, in which are mounted parallel to one another a plurality of prisms J, which extend the width of the frame and are provided with slides K.

L represents handles having square shanks which pass through triangular plates M, fixed to the ends of the prism J. N represent pins on the other end of the prisms engaging holes in the frame. The prisms are revolved by the handles L.

The prisms and slides are made of wood, cardboard, or the like, thin metallic plates, or other material that is suitable for the purpose and are preferably triangular, as shown in the drawings. Provision is made for keeping vertical the face of the prism which is exposed to the front by means of a spring or springs bearing on the plate M or by any other simple method.

S designates a rectangular prism with numbers on one or both sides, as may be required.

Figs. 1, 5, and 6 represent, respectively, the manner in which three sides of the ten prisms J are marked, colored, and numbered. In Fig. 1 the numbers "1" to "10," arranged horizontally, are shown marked one on each of ten divisions of the face of the rectangular prism S, the width of which is divided into eleven equal spaces. Numbers "1" to "10" are marked on and represent the prisms J in their order. The rest of this face of each prism J is divided by vertical lines into eleven equal divisions. The five divisions to the left are colored, respectively, red or green as marked, the sixth column is left blank or may be colored black, and the remaining five columns are filled with numbers. The slides K for the five upper prisms J (marked "1" to "5") are in length equal to five horizontal divisions and are of one color, but neither red nor green, and the slides K for the lower five prisms J (marked "6" to "10") are of the same length—viz., equal to five horizontal divisions—and have the divisions marked on them and colored as follows: for prism 6, five red divisions; for prism 7, four divisions red and one green; for prism 8, three red and two green; for prism 9, two red and three green, and for prism 10 one red and four green.

It will be seen that when the prisms are turned to exhibit the faces shown in Fig. 1 by moving the slides from left to right one space at a time the components of numbers from "1" to "5" are shown concretely on the first five prisms immediately on the left of the slides, and the corresponding numbers are shown immediately on the right. The five lower slides are colored to correspond with the prisms below them in such a way that by moving the slides to the right one space at a time the components of the numbers from "6" to "10" are shown, as above. Other faces of the prisms J, not shown in Fig. 1, will be divided into twenty-one divisions instead of eleven—ten divisions being colored red or green, respectively, as shown in Figs. 5 and 6, one division blank or colored black and the remaining ten divisions to the right having numbers on them from "1" to "100," as shown. The face of prism S to be used with the faces of prisms J (shown in Figs. 5 and 6) has the ten numbers "1" to "10" marked on ten divisions, the remainder of the length equal to eleven divisions being left blank.

If the prisms are turned to show the sides marked as in Fig. 5, the frame can be used to illustrate the principles of addition and subtraction with numbers up to one hundred, concretely on the left, and in numbers corresponding to the concrete representations on the right.

In using the frame one must commence at the top prism, read from left to right and work down toward the bottom prism. Assuming the sum of "27 + 7 + 9" is required, expose twenty-seven squares by moving the first two slides to the end of the first two colored parts of the prisms and the third along the third row as far as the seventh square. Immediately to the right of these slides there will be found the numbers "10," "20," and "27," respectively. Now add the "7" by making up the whole "10" in the third row by exposing a further "3" (one of the components of "7") and exposing on the next row "4," (the other component of "7,") showing the sum in the concrete and abstract. In the same way proceed in adding the "9" by completing the "10" in row four by exposing a further six squares and revealing the remaining "3" on the row "5," thus showing the sum "43," which is the sum of "27 + 7 + 9" required and will be indicated to the right of the slide in the fifth row.

In subtraction the inverse method is performed.

Third side: Proceeding to the still more definite idea of numbers, the pupil is introduced to the third side, colored and numbered as in Fig. 6, which illustrates the principles of multiplication and division in the following way: Say the product of seven times nine is desired to be illustrated. This product is made definite in primary units on the decimal system by first exposing the derived unit "9." On the left of this derived unit is the number "1," and on the right of the slide is "9," showing one nine or nine taken once. Move the next and following slides in the same way, showing the products in ascending order concretely to the left and in numbers on the right. The numbers of the colored squares on the left represent the number of times the derived unit is taken, and the numbers on the right of the slides the several and total products.

In division the inverse process is performed; but whether in multiplication or division the construction of the quantities required to be made definite and the methods used are always shown in the concrete on the left and in corresponding numbers on the right.

What I claim as my invention, and desire to secure by Letters Patent of the United States, is—

1. Apparatus for teaching arithmetic comprising a frame, a plurality of rotatable prisms each carrying ciphers and differently-colored divisions mounted in said frame, and means for covering and uncovering part of the surfaces of said prisms for the purpose set forth.

2. Apparatus for teaching arithmetic comprising a frame, a plurality of rotatable prisms having each toward one end a series of divisions and toward the other end numbers equivalently spaced, and means for covering a given length of the surfaces of each said prism for the purpose set forth.

3. Apparatus for teaching arithmetic comprising a frame, a plurality of rotatable prisms each carrying ciphers and differently-colored divisions mounted in said frame and a series of slides adapted to be manipulated to cover a given length of the surfaces of each of said prisms for the purpose set forth.

4. Apparatus for teaching arithmetic comprising a frame, a series of rotatable prisms each having variously-colored divisions and other variously-numbered divisions mounted in said frame, a series of slides adapted to cover part of the length of each said prism, said slides having differently-colored divisions on their surface substantially as described.

5. Apparatus for teaching arithmetic comprising a frame, a plurality of rotatable prisms having their surfaces divided in two series of equal divisions, one series being numerical signs, slides movable longitudinally on said prisms and adapted to cover such space thereof that the uncovered divisions at one end have a numerical relation to the sign marked on the division to the right thereof substantially as described.

In witness whereof I have signed this specification in the presence of two witnesses.

ANDREW LEITCH.

Witnesses:
H. NIXON,
C. S. GARDNER.